(12) United States Patent
Levy et al.

(10) Patent No.: US 7,801,294 B2
(45) Date of Patent: Sep. 21, 2010

(54) SYSTEM AND METHOD FOR RESUMING AUTOMATIC ADVANCE CALLING TO CONTACTS

(75) Inventors: Jacqueline Levy, Sunnyvale, CA (US); Michael Sharland, Santa Clara, CA (US); Jay Maskell, Morgan Hill, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 974 days.

(21) Appl. No.: 11/228,615

(22) Filed: Sep. 15, 2005

(65) Prior Publication Data
US 2007/0064909 A1    Mar. 22, 2007

(51) Int. Cl.
*H04M 3/42* (2006.01)
*H04M 7/00* (2006.01)

(52) U.S. Cl. .............................. 379/211.03; 379/221.01
(58) Field of Classification Search ............ 379/211.02, 379/211.03
See application file for complete search history.

(56) References Cited

U.S. PATENT DOCUMENTS

| 6,097,804 | A * | 8/2000 | Gilbert et al. | 379/230 |
|---|---|---|---|---|
| 6,678,366 | B1 | 1/2004 | Burger et al. | |
| 6,751,459 | B1 * | 6/2004 | Lee et al. | 455/445 |
| 6,798,767 | B1 * | 9/2004 | Alexander et al. | 370/352 |
| 7,440,565 | B2 * | 10/2008 | McLarty et al. | 379/211.02 |
| 2003/0002645 | A1 * | 1/2003 | Worsham et al. | 379/211.03 |
| 2005/0250546 | A1 | 11/2005 | Asthana | |
| 2006/0153353 | A1 * | 7/2006 | O'Neil | 379/211.02 |

* cited by examiner

*Primary Examiner*—Curtis Kuntz
*Assistant Examiner*—Mohammad K Islam

(57) ABSTRACT

A telecommunications system includes a network; a telephony client operably coupled to the network and configured to maintain a list of contact telephone numbers; a telephony server operably coupled to the network and including an automatic advance sequence service including means for sequentially calling a contact on said list at one or more numbers associated with the contact and if the call is completed at one of the one or more numbers, continuing to call the remaining ones of the one or more numbers in sequence.

13 Claims, 10 Drawing Sheets

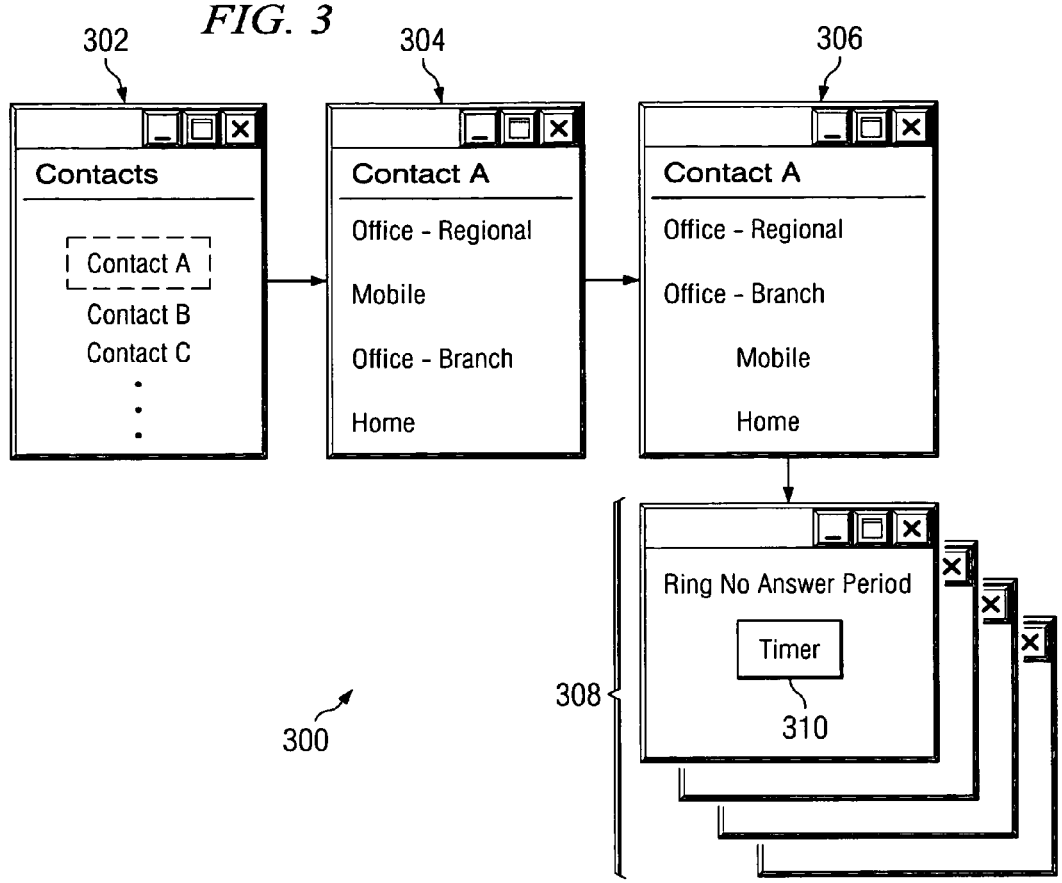
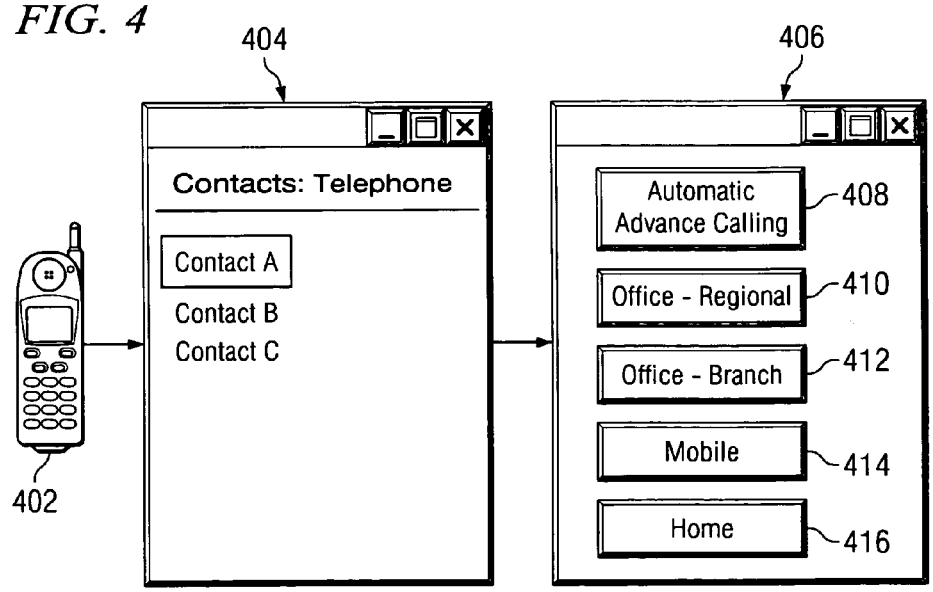

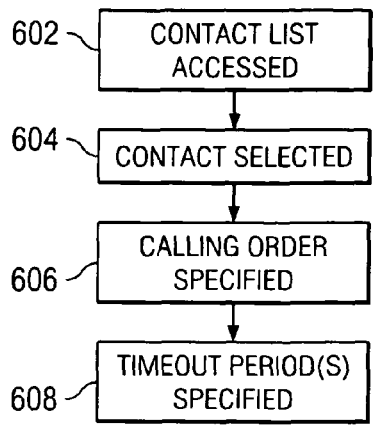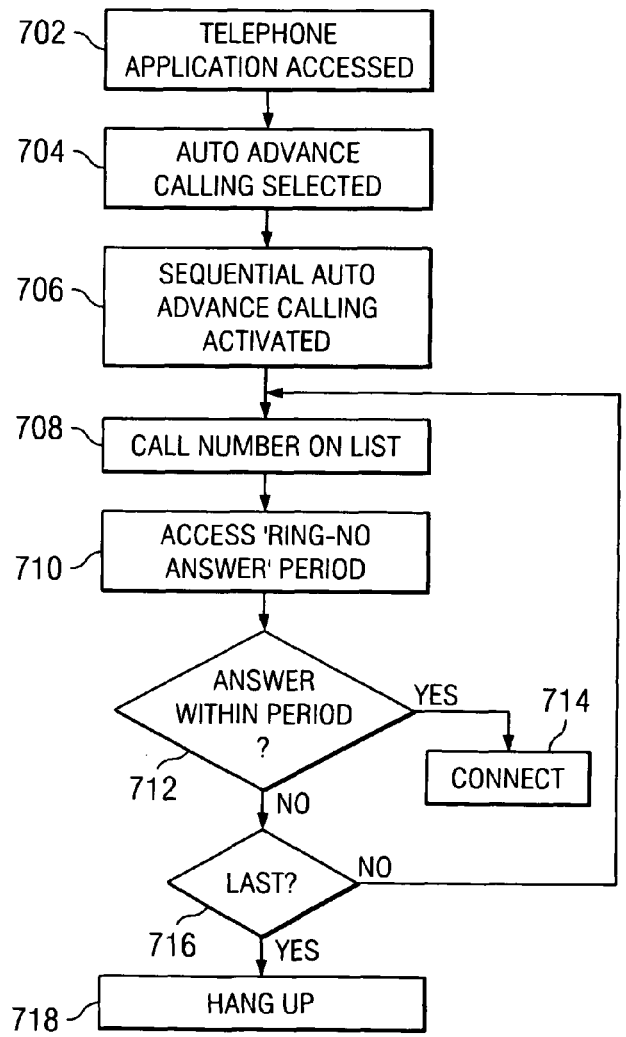

SYSTEM AND METHOD FOR RESUMING AUTOMATIC ADVANCE CALLING TO CONTACTS

CROSS REFERENCE TO RELATED APPLICATIONS

The present application is related to commonly assigned, co-pending U.S. patent application Ser. No. 11/228,418, titled METHOD AND APPARATUS FOR AUTOMATIC ADVANCE CALLING TO CONTACTS, filed concurrently herewith.

BACKGROUND OF THE INVENTION

1. Field of the Invention

The present invention relates to telecommunications systems and, in particular, to an improved system for calling parties in an address book.

2. Description of the Related Art

Modern telecommunications systems allow users to store contact information of other users in tools such as Microsoft Outlook. Often the other users have multiple telephone numbers. For example, a user may have an office phone, a mobile phone, and a home phone. Typically, unless a calling party user and a called party user are on a system that allows exchange of presence information, or the parties have manually exchanged such information, the calling party user has no idea of which of the called party user's numbers he should call. Thus, in order to telephone a given user, a calling party user may have to dial multiple telephone numbers and/or make multiple telephone calls before one goes through to the called party user.

SUMMARY OF THE INVENTION

These and other drawbacks in the prior art are overcome in large part by a system and method according to embodiments of the present invention.

A telecommunications system according to embodiments of the present invention includes a network; a telephony client operably coupled to the network and configured to maintain a list of contact telephone numbers; a telephony server operably coupled to the network and including an automatic advance sequence service including means for sequentially calling a contact on said list at one or more numbers associated with the contact and if the call is completed at one of the one or more numbers, continuing to call the remaining ones of the one or more numbers in sequence.

A telecommunications method according to embodiments of the present invention includes sequentially calling a contact at one or more numbers associated with the contact and if the call is completed at one of the one or more numbers, continuing to call the remaining ones of the one or more numbers in sequence. In certain embodiments, the user may be provided with an option whether or not to proceed with the continuing to call. The option may be provided using a browser interface.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3 is a diagram illustrating operation of embodiments of the present invention.

FIG. 4 is a diagram illustrating operation of embodiments of the present invention.

FIG. 6 is a flowchart illustrating operation of embodiments of the present invention.

FIG. 7 is a flowchart illustrating operation of embodiments of the present invention.

DETAILED DESCRIPTION OF EMBODIMENTS OF THE INVENTION

Figure 1:
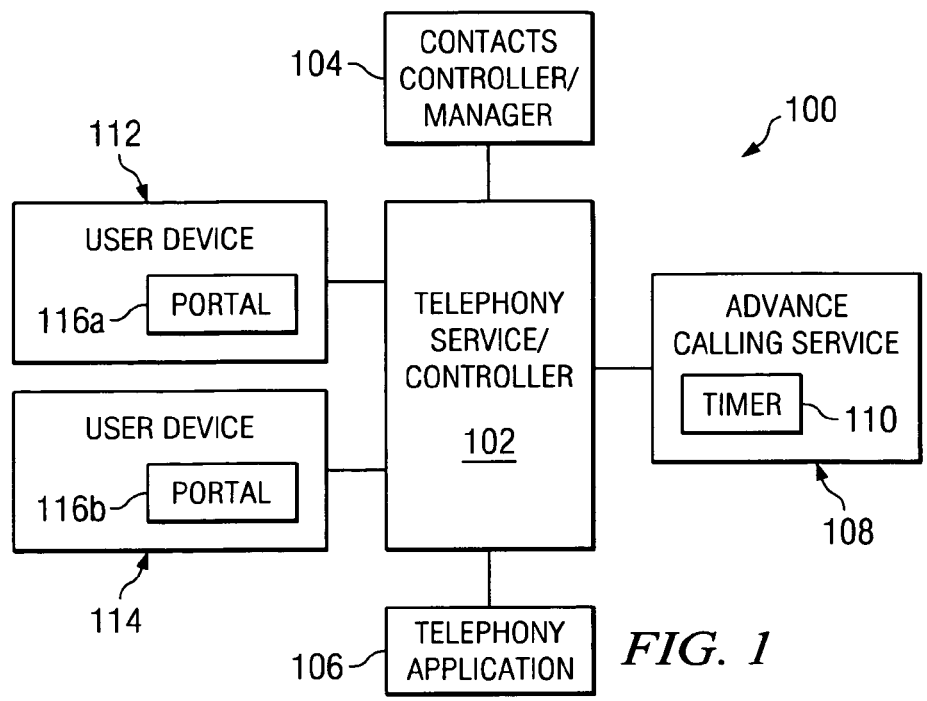
FIG. 1 is a diagram schematically illustrating a system according to embodiments of the present invention.

Turning now to the drawings and, with particular attention to FIG. 1, a diagram of a telecommunications system 100 according to an embodiment of the present invention is shown. The system includes a telephony service 102, which may include, be operably coupled to, or in communication with, a contact controller/manager 104, one or more telephony application(s) or client(s) 106, and an advance calling service 108. The advance calling service 108 may further include one or more timers 110 for timing a "ring no answer" period.

User devices, such as user devices 112, 114 may be operably coupled to or in communication with the telephony service 102, including the contact manager 104 and the advance calling service 108. In some embodiments, a user device may be or include such things as telephones, cellular telephones, PDAs, computers, etc. For example, the user devices 112, 114 may be personal computers implementing the Windows XP™ operating system. In addition, the user devices 112, 114 may include telephony and other multimedia messaging capability using, for example, peripheral cameras, Webcams, microphones and speakers (not shown) or peripheral telephony handsets, such as the Optipoint™ handset available from Siemens Communications, Inc.

The user devices may be equipped with server or web access portals 116a-116b, respectively, for communicating with the telephony service 102, the contact manager 104, and the advance calling service 108, as will be explained in greater detail below. The server access portal 116a, 116b may also be operably coupled to, or incorporate, the telephony application or client 106, so as to be able to make telephone calls and perform other telephony and related functions using the web access portal 116a, 116b and via the telephony service 102. For example, a user may be able to select a contact using his web access portal 116a, 116b and thereby make a telephone call to that contact via the telephony client/application 106 and telephony service 102. In accordance with embodiments of the present invention, the server access portals 116a-116b may be used to set contacts, and specify a calling order, as well as "ring no answer" timeout values.

Thus, the server access portals 116a-116d may provide for bi-directional communication of signaling, setup, and control for, among other things, telephone calls. In certain embodiments, the server access portals 116a, 116b may be embodied as web browsers, such as Microsoft Explorer, Netscape Navigator, and Mozilla Firefox, and any necessary add-ons and cooperating programs, as will be described in greater detail below.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

The telephony service 102 allows the user to make and setup telephone calls. The telephony service 102 may be implemented in hardware and/or software operating on one or more servers, computer systems, host or mainframe computers, workstations, etc. In some embodiments, the telephony service 102 may be operating on some or all of the same devices as other components in the system 100.

The contact manager 104 allows a user to set up an "address" book for persons he wishes to call. In some embodiments, the user may employ his web portal 116a, 116b to access a suitable web page at a server hosting the contacts manager 104. The contact manager 104 may be implemented in hardware and/or software operating on one or more servers, computer systems, host or mainframe computers, workstations, etc. In some embodiments, the contact manager 104 may be operating on some or all of the same devices as other components in the system 100.

The advance calling service 108 allows a user to configure his contacts for automatic advance calling: when activated, the contacts' telephone numbers are automatically called, one at a time, until he is reached or the list is exhausted, in an order specified by the user. In addition, according to certain embodiments, the user can configure each telephone number with its own "ring no answer" timeout value. When the timeout is reached, the automatic advance calling service 108 continues to the next number in the sequence. The advance calling service 108 may be implemented in hardware and/or software operating on one or more servers, computer systems, host or mainframe computers, workstations, etc. In some embodiments, the advance calling service 108 may be operating on some or all of the same devices as other components in the system 100.

Figure 2:
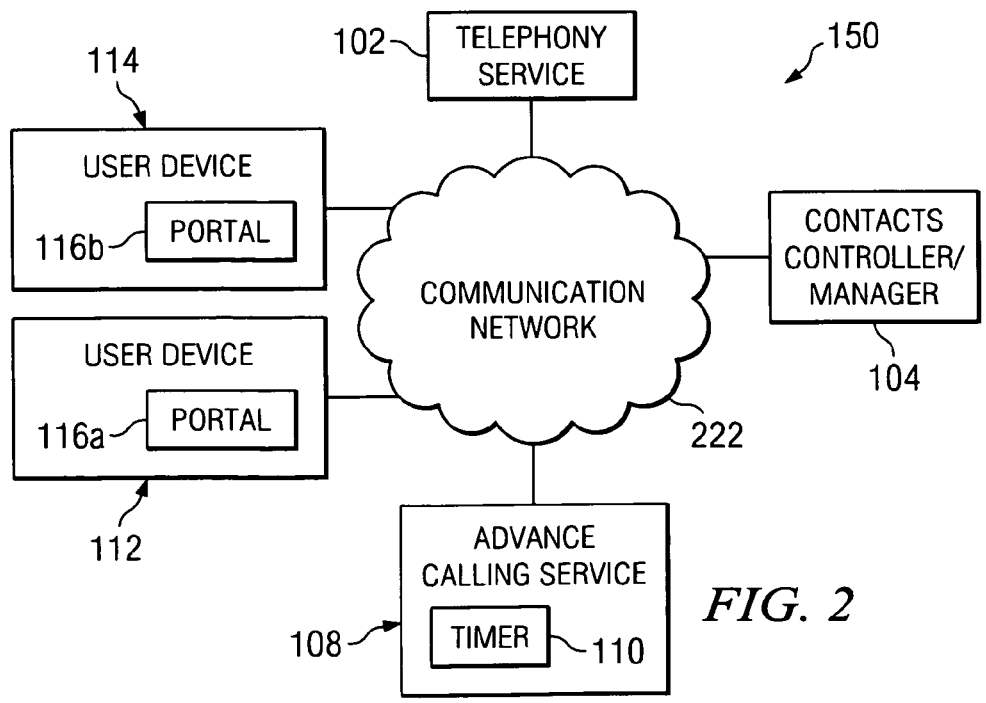
FIG. 2 is a diagram schematically illustrating a system according to embodiments of the present invention.

In certain embodiments of the present invention, one or more of the components of the system 100 may be connected to or in communication with each other via a communication network. For example, turning now to FIG. 2, a system 150 including various components of the system 100 is illustrated, wherein some or all of the components are in communication via a network 222. The network 222 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, etc. Moreover, as used herein, communications include those enabled by wired or wireless technology. In some embodiments, some or all of the network 222 may be implemented using a TCP/IP network and may implement voice or multimedia over IP using, for example, the Session Initiation Protocol (SIP).

An exemplary environment capable of being adapted for use in a system according to embodiments of the present invention is the OpenScape system, available from Siemens Communications, Inc. Such an environment can be implemented, for example, in conjunction with Windows Server, Microsoft Office Live Communications Server, Microsoft Active Directory, Microsoft Exchange and SQL Server.

Turning now to FIG. 3, a diagram schematically illustrating operation of an embodiment of the present invention is shown. In particular, shown are various windows 300 that may be generated, for example, by a web browser 116 and/or telephony application 106 on a personal computer. The web browser 116 may be used, for example, to access a contacts manager 104 on a server. Window 302 illustrates a contacts window, showing contacts A, B, and C. Typically, the contacts may be entered in any convenient fashion, such as via a computer keyboard and/or graphical user interface.

In operation, a user may employ a cursor pointing device, such as a mouse, to select one of the contacts (in this case, contact A). Once a contact has been selected, the user may enter a dialog for entering user data, such as window 304. In the example shown, the user has entered an Office-Regional telephone number, a Mobile telephone number, an Office-Branch telephone number, and a Home telephone number. It is noted that more or fewer telephone numbers may be handled in this manner. Thus, the figures are exemplary only. The telephone numbers may be arranged in any order. According to embodiments of the present invention, the user may arrange the telephone numbers in a desired auto dialing order. For example, the user may employ a cursor pointing device (not shown) to "click and drag," or use some other method of indicating order. As shown in window 306, the numbers may be arranged, for example, in order: Office-Regional; Office-Branch; Mobile; and Home. Once the automatic advance calling order has been selected and entered, the user may select a "Ring No Answer" period for the telephone numbers, as shown in window(s) 308. A field 310 may be provided for entering a timeout period (typically in seconds), although dropdown menus may also or alternatively be provided. It is noted that different "ring no answer" periods may be set for each of the contact's telephone numbers. The resulting periods are then stored for access by the advance calling service 108.

Turning now to FIG. 4, a diagram illustrating automatic advance calling activation is shown according to embodiments of the present invention. To make a telephone call using automatic advance calling, a user typically will activate a telephony application (represented by icon 402 in FIG. 4) and an address book window associated with a telephony application 106. The telephony application 106 may interface to a web access client 116 for accessing a telephony service 102, contacts manager 104, and advance calling service 108.

For example, shown in an exemplary window 404 is a list of contacts A, B, and C. The user may select, for example, contact A (shown highlighted). In the example illustrated, selection of a contact causes a transition to window 406. Window 406 illustrates an exemplary listing of telephone numbers and/or telephone functions related to the contact.

As shown, the user can select "automatic advance calling" 408 office-regional 410, office-branch 412, mobile 414, and home 416. If the user selects an individual telephone number, his telephony application 106 will make the call to the number via the telephony service 102. However, if the user selects auto advance calling 408, then the advance calling service 108 will attempt to call the contact at the numbers specified during setup, until one is reached or the list is exhausted.

Figure 5:
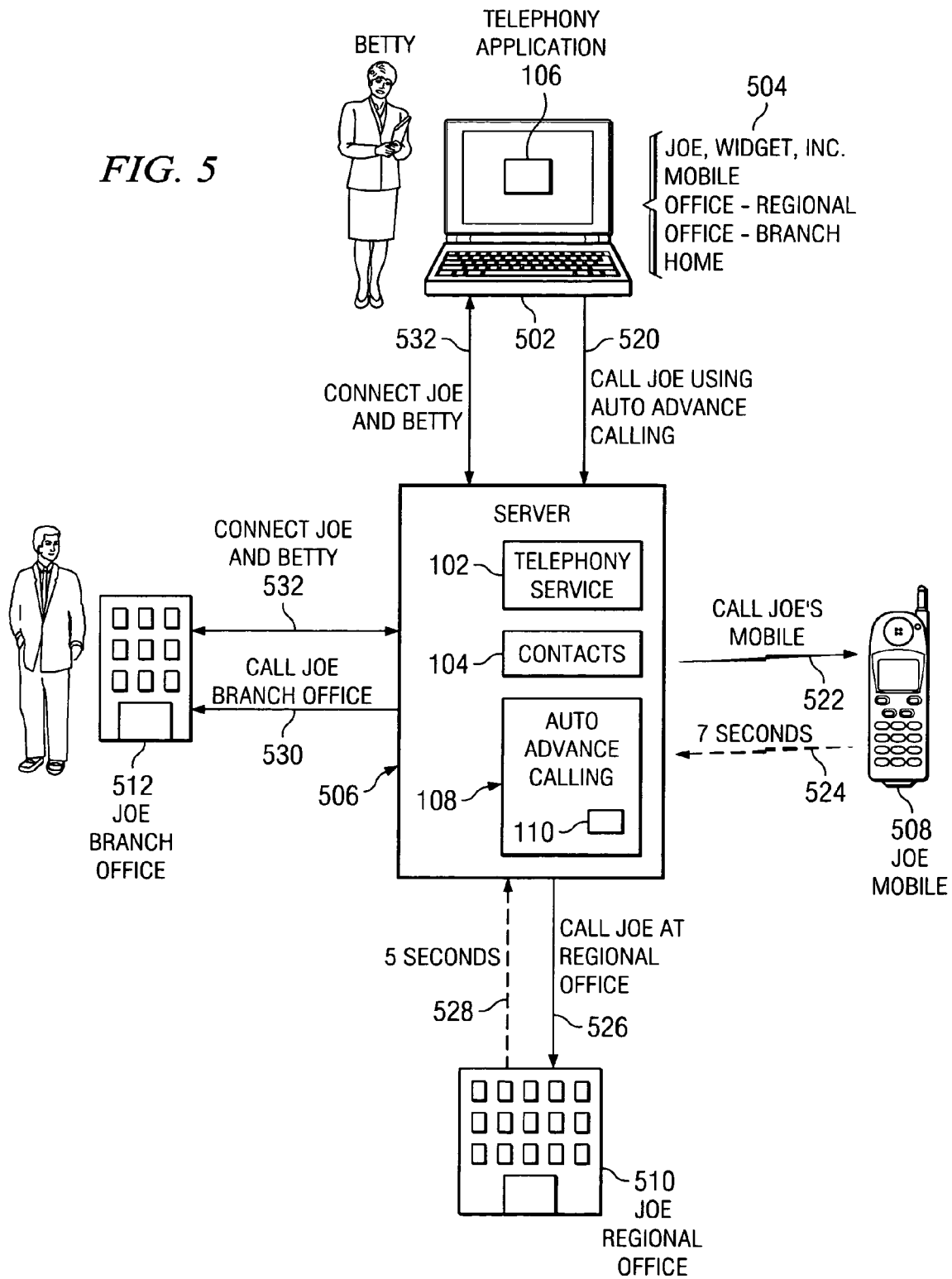
FIG. 5 is a diagram illustrating operation of embodiments of the present invention.

Turning now to FIG. 5, operation of an embodiment of the present invention is illustrated schematically by way of example. In the example illustrated, a user Betty may have a personal computer 502 that implements a telephony application 106 and is associated with a server 506 that implements a telephony service 102, an auto advance calling service 108, and a contacts manager 104. The user Betty may maintain an advance calling list 504 for a party Joe. Joe may be associated with a mobile telephone 508, a regional office telephone 510, a branch office telephone 512, and a home telephone (not shown). User Betty's advance calling list for Joe has his telephone numbers in order: mobile, office-regional, office-branch, and home.

In operation, as shown at 520, user Betty can cause her telephony application 106 to call Joe, for example, by clicking on an "auto advance calling" feature button (FIG. 4). The auto advance calling service 108 will then interact with the contacts manager 104 to cause the telephony service 102 to call Joe in order of the numbers specified in the advance calling list. Initially, the telephony service 102 calls Joe at his mobile phone 508, as shown at 522. In the example illustrated, Joe does not answer his mobile within the "ring no answer" period (here, shown at 7 seconds) at 524. Consequently, the advance calling service 108 will cause the telephony service 102 to call Joe at the next number in Betty's list, namely, at Joe's regional office 510, as shown at 526. In this example, as shown at 528, Joe does not pick up at his regional office telephone within the regional office "ring no answer" period of five seconds. The advance calling service 108 then causes the telephony service 102 to try to connect to Joe at his branch office 512, as shown at 530. In this example, Joe picks up, and Betty and Joe are connected at 532.

Turning now to FIG. 6, a flowchart 600 illustrating operation of an embodiment of the present invention is shown. The particular arrangement of elements in the flowchart 600 is not meant to imply a fixed order to the elements; embodiments can be practiced in any order that is practicable.

Initially, in a step 602, a user's contact list is accessed. As noted above, this can include the user employing his web browser 116 (and/or telephony client 106) for logging in to a suitable web page and accessing the contacts manager 104 maintained at a server. The contacts may then be manipulated at the server. Alternatively, the contacts list could be maintained local with the user and upon updating, the revised contact information can be transmitted to the server.

In either case, in a step 604, a contact may be selected for configuring with the auto advance calling feature. As discussed above, this may be accomplished via a user interface such as described in FIG. 3. In a step 606, the user can order the contact's telephone numbers using a graphical interface window such as window 306 (FIG. 3). The changes may be stored by the contacts manager 104 and are accessible by the auto advance calling service 108. Finally, in a step 608, the user can specify one or more "ring no answer" periods, e.g., using a window such as window 308 of FIG. 3.

Turning now to FIG. 7, a flowchart 700 illustrating operation of an embodiment of the present invention is shown. The particular arrangement of elements in the flowchart 700 is not meant to imply a fixed order to the elements; embodiments can be practiced in any order that is practicable.

Initially, in a step 702, the telephony application 106 may be accessed, for example, by clicking on an appropriate program icon on a personal computer. In a step 704, the automatic advance calling feature may be selected for a given contact, for example, via an interface similar to that of FIG. 4. In a step 706, the automatic advance calling feature can then be activated with regard to the particular contact selected.

Thus, in a step 708, a first number on the contact's list is called. In a step 710, the advance calling service 108 can access the "ring no answer" period associated with the number called. In a step 712, the timer 110 times the "ring no answer" period, and the advance calling service 108 checks if the timer has expired. If there is an answer within that period, the called contact is connected to the user, in a step 710. Otherwise, in a step 714, the advance calling service 108 determines if the number was the last one on the list. If it was, then in a step 716, the caller can be made to hang up. If the number is not the last one on the list, then the next number can be accessed, at step 718. This procedure can repeat until the list is exhausted or the contact answers.

Figure 8:
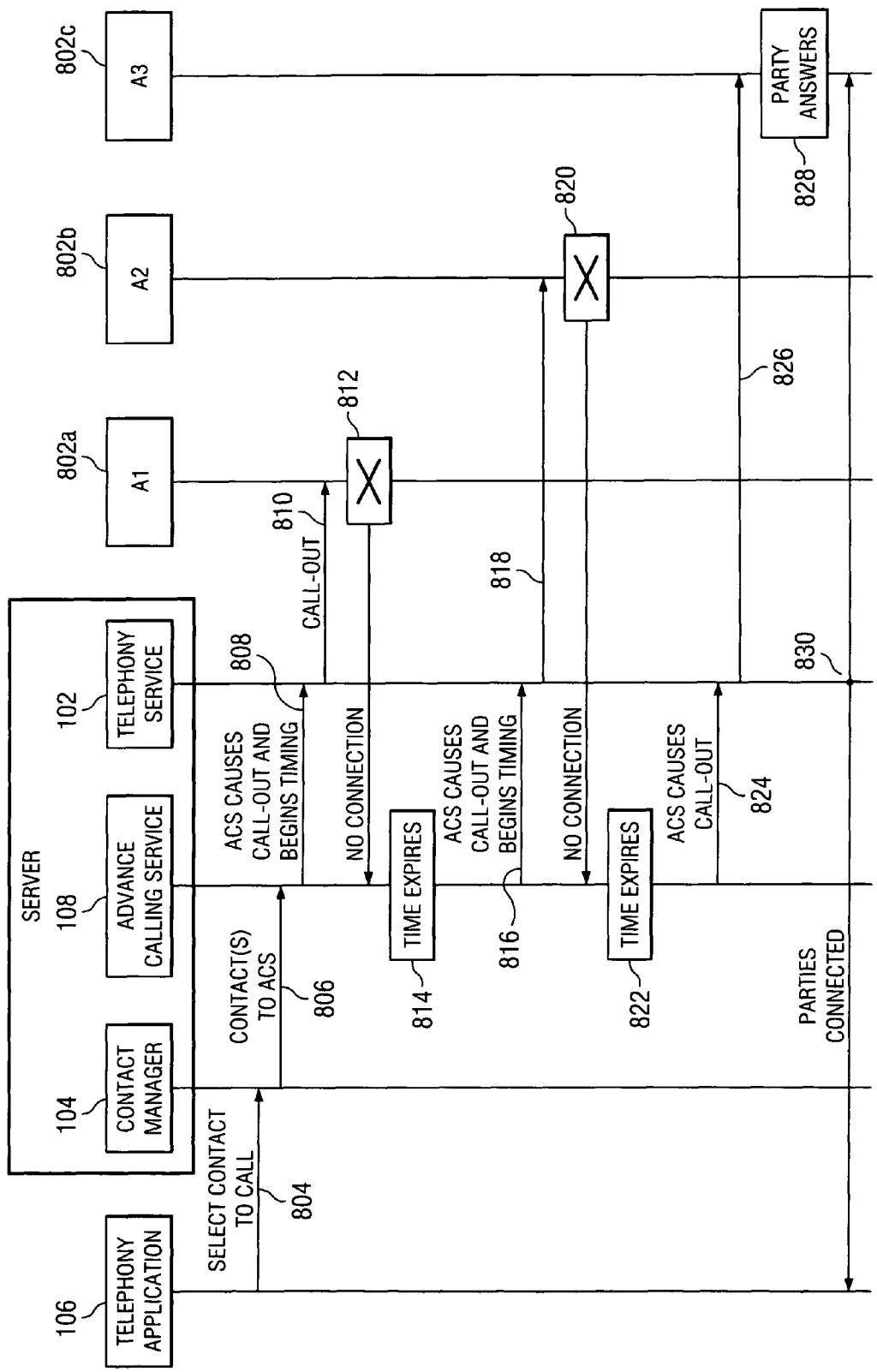
FIG. 8 is a diagram illustrating operation of embodiments of the present invention.

Turning now to FIG. 8, a diagram schematically illustrating operation of an embodiment of the present invention is shown. Shown is a telephony application 106, a contact manager 104, an advance calling service 108, a telephony service 102, and a called party A1 802a, A2 802b, A3 802c.

In operation, a user opens his telephony application 106 and accesses the contact manager 104 for the address of the party he wishes to call, as shown at 804. As noted above, the telephony application 106 may be associated with a web browser, e.g., as a plug-in, to allow web-type access.

As discussed above, if the user selects an individual telephone number, then the number is dialed, and the telephony service 102 can make the call, for example, in a conventional manner. If the user selects advance calling, however, then the advance calling service 108 accesses the contact list of numbers and "ring no answer" times from the contact manager 104, as shown at 806. The advance calling service 108 then causes the telephony service 102 to call out to the first number, and begin timing the "ring no answer" period, at 808. The telephony service 102 calls out to the first number A1 802a, at 810. At 812, the first number A1 802a can fail to pick up within the timeout period. That is, the timer 110 can expire, as shown at 814.

In response, the advance calling service 108 causes the telephone service 102 to call the next number in the sequence and begin timing, at 816. At 818, the telephony service 102 dials out to the user A2 802b. At 820, the second number A2 802b can fail to connect and the timer can expire at 822.

The advance calling service 108 will then cause the telephone service 102 to dial out to the next number in the list, at 824. The telephone service 102 calls out to user A3 802c at 826. At 828, the user can pick up, and can be connected to the caller telephone application 106 at 830.

Figure 9:
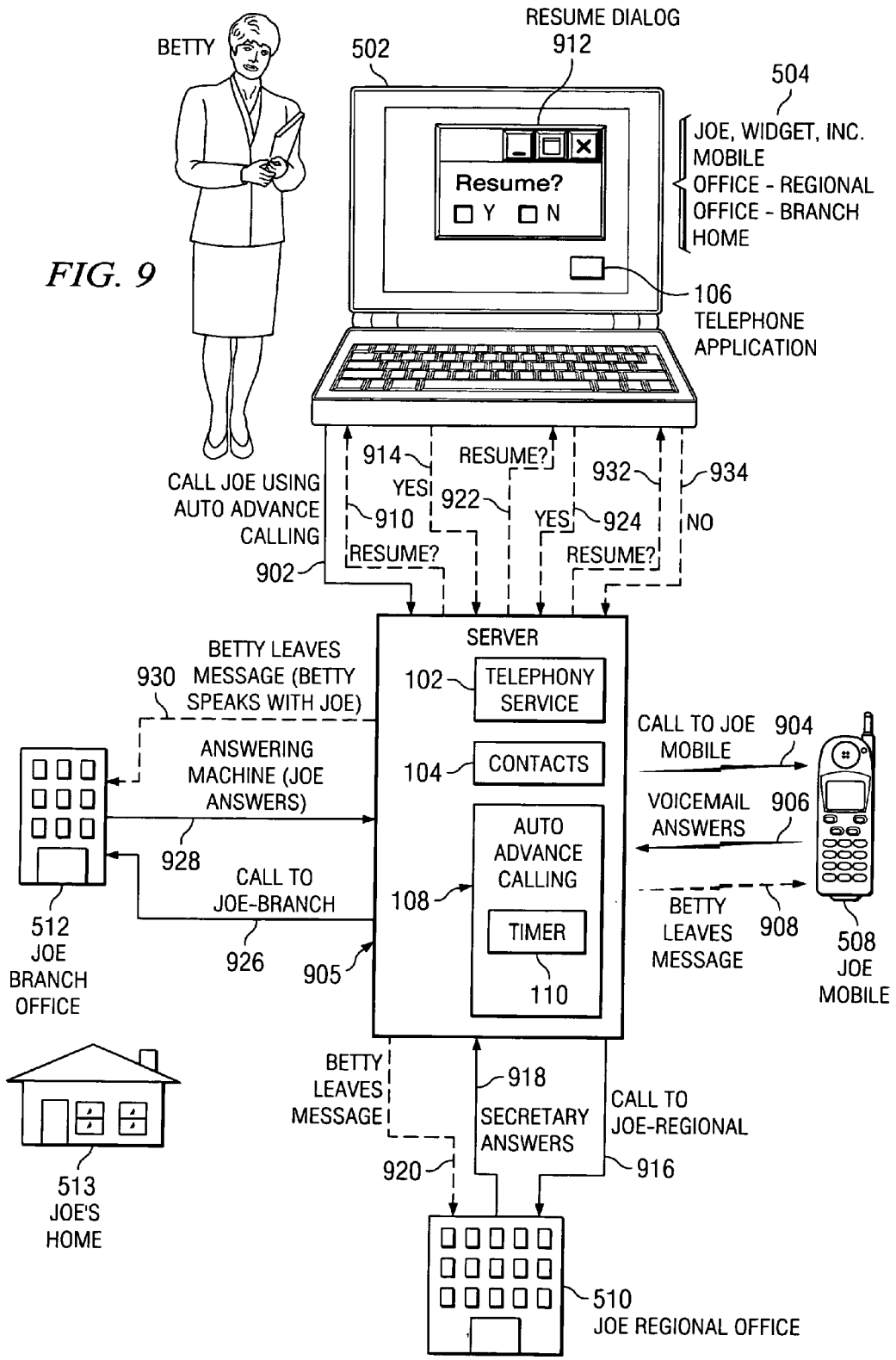
FIG. 9 is a diagram illustrating operation of an embodiment of the present invention.

As can be appreciated, in many instances, a called party is equipped with an answering device, voicemail, or other answering service at one or more of his telephones. Embodiments of the present invention allow the user to continue with the automatic advance calling even when a voicemail or other answering service picks up. One method of doing so is illustrated by way of example in FIG. 9.

In a manner generally similar to FIG. 5, a user Betty may have a personal computer 502 that implements a telephony application 106 and is associated with a server 506 that implements a telephony service 102, an auto advance calling service 108, and a contacts manager 104. The user Betty may maintain an advance calling list 504 for a party Joe. Joe may be associated with a mobile telephone 508, a regional office telephone 510, a branch office telephone 512, and a home telephone 513. User Betty's advance calling list 504 for Joe has his telephone numbers in order: mobile, office-regional, office-branch, and home.

In operation, as shown at 902, user Betty 502 can cause her telephony application to call Joe, for example, by clicking on an "auto advance calling" feature button (FIG. 4). The auto advance calling service 108 will then interact with the contacts manager 104 to cause the telephony service 102 to call Joe in order of the numbers specified in the advance calling list. Initially, the telephony service 102 calls Joe at his mobile phone 508, as shown at 904.

In the example illustrated, Joe's mobile telephone voicemail can pick up, as shown at 906. If this is the case, then at 908, Betty can leave a voicemail message for Joe. Once that call is completed, the auto advance calling service 108 will query Betty as to whether she wishes to continue calling Joe at the numbers specified in the advance calling list, at 910. For example, the system may cause a web browser pop up window or other dialog, such as window 912 to appear at user Betty's computer. The dialog 912 allows user Betty to select YES or NO. In this example, Betty selects YES, at 914, which is received by the auto advance calling service 108.

The auto advance calling service 108 then calls out to the next number in the list; in the example shown, the auto advance calling service calls out to Joe's regional office number at 916. At 918, Joe's secretary picks up. Betty can leave a message at 920. Again, the auto advance calling service 108 will query Betty as to whether she wishes to continue with auto advance calling, as shown at 922. As noted above, this may be done via dialog 912. In the example illustrated, Betty again selects YES, at 924. This is received at the auto advance calling service 108, which causes the telephony service 102 to call out to Joe at the next number in the list. In this case, it is Joe's branch office telephone number, as shown at 926. In the example shown, at 928, either an answering machine or service can pick up, or Joe himself can finally answer the telephone. At 930, Betty can leave a message or speak with Joe. Once this is done, the auto advance calling service will again query Betty, for example, using the dialog 912 at 932. In this example, Betty decides not to continue (thereby calling Joe at home 513) and selects NO, at 934, and the call is terminated.

Figure 10:
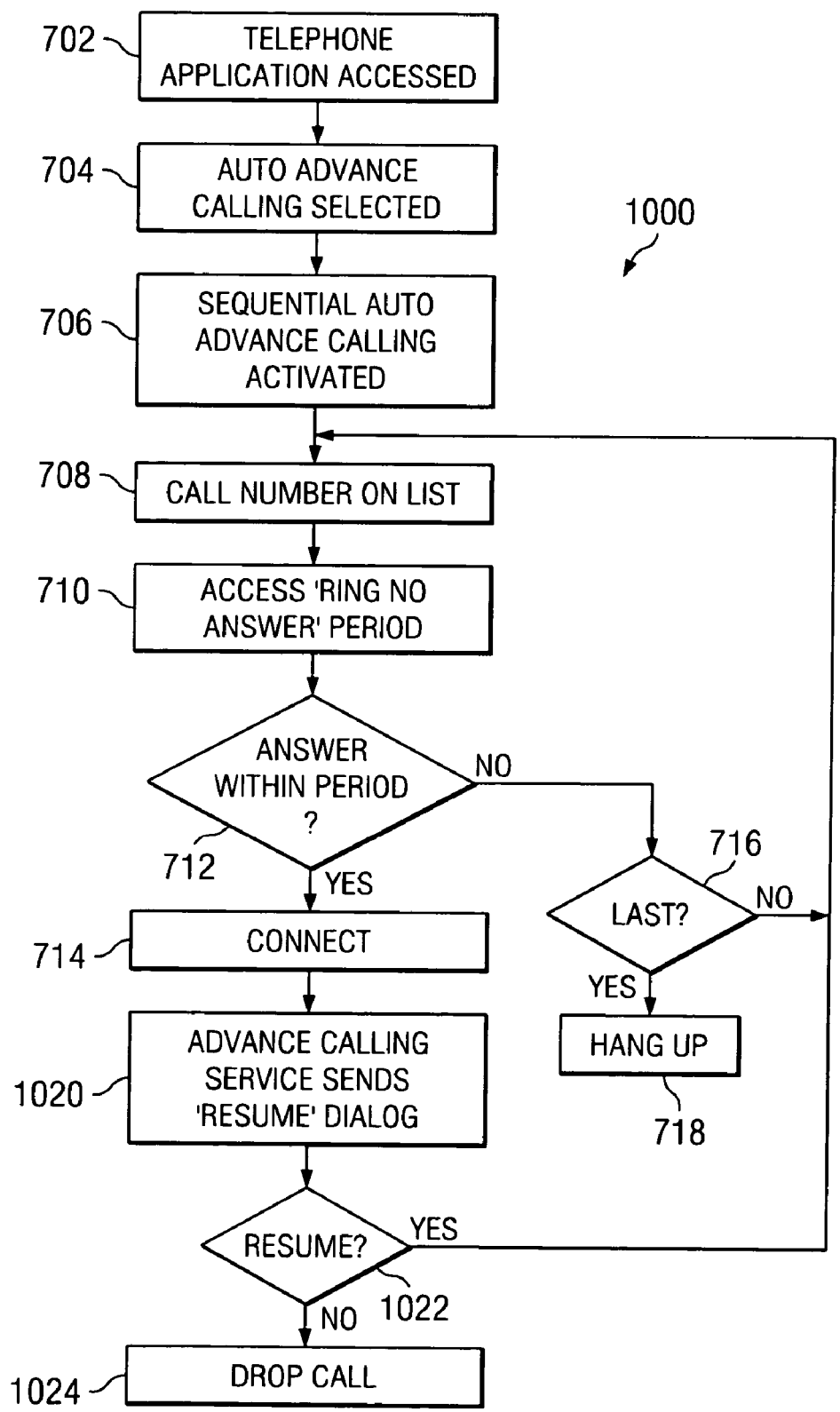
FIG. 10 is a flowchart illustrating operation of an embodiment of the present invention.

Turning now to FIG. 10, a flowchart 1000 illustrating operation of an embodiment of the present invention is shown. The particular arrangement of elements in the flowchart 1000 is not meant to imply a fixed order to the elements; embodiments can be practiced in any order that is practicable.

The flowchart 1000 is generally similar to flowchart 700 of FIG. 7. In this case, however, if the call connects at step 714, then at a step 1020, the auto advance calling service 108 sends the "resume" dialog to the caller. In a step 1022, the caller can select YES or NO, which is then received by the auto advance calling service 108. If the caller selects YES, then the system cycles back to the next number on the list, at step 708. Otherwise, however, in a step 1024, the auto advance calling service 108 will cause the telephony service 102 to terminate processing of the call.

Figure 11:
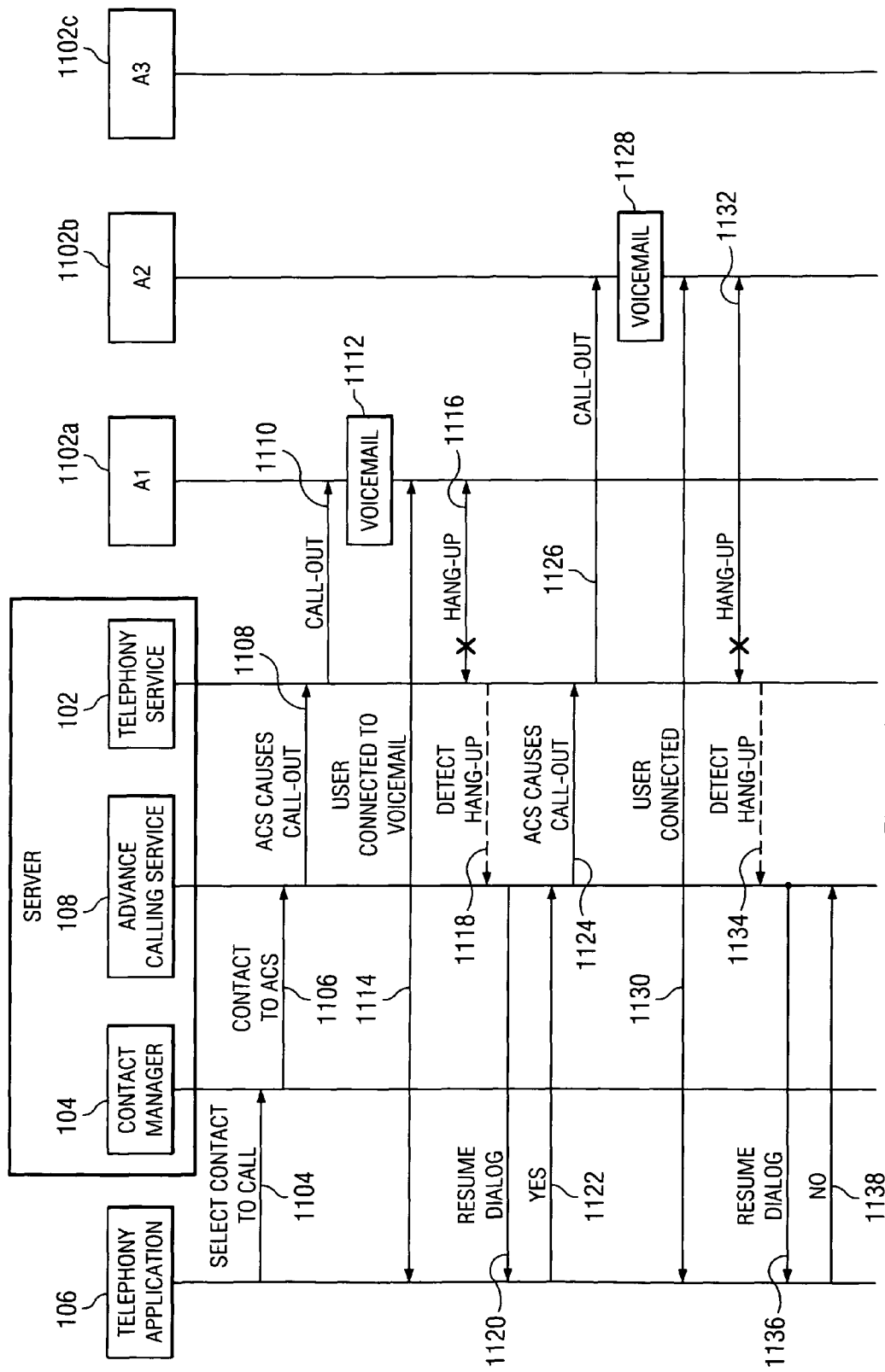
FIG. 11 is a diagram illustrating operation of embodiments of the present invention.

Turning now to FIG. 11, a diagram schematically illustrating operation of an embodiment of the present invention is shown. Shown is a telephony application 106, a contact manager 104, an advance calling service 108, a telephony service 102, and a called party A1 1102a, A2 1102b, A3 1102c.

In a manner similar to that discussed above with reference to FIG. 8, in operation, a user opens his telephony application 106 and accesses the contact manager 104 for the address or number of the party he wishes to call, as shown at 1104. The telephony application 106 may be associated with a web browser, e.g., as a plug-in, to allow web-type access.

If the user selects an individual telephone number, then the number is dialed, and the telephony service 102 can make the call, for example, in a conventional manner. If the user selects advance calling, however, then the advance calling service 108 accesses the contact list of numbers and "ring no answer" times from the contact manager 104, as shown at 1106. The advance calling service 108 then causes the telephony service 102 to call out to the first number, and begin timing the "ring no answer" period, at 1108. The telephony service 102 calls out to the first number A1 802a, at 1110.

As shown at 1112, it is possible for a voicemail or other answering service associated with the telephone 1102a to pick up. The user can leave a message, at 1114. Once the message is left, the system can disconnect with the called party telephone 1102a, as shown at 1116. The disconnection can be detected by the advance calling service 108, at 1118. In response, the auto advance calling service 108 causes the dialog 912 (FIG. 9) to be sent to the calling party, for example, via the web portal 116 and/or the telephony application 106, at 1120. At 1122, the user can select YES, which the telephony application 106 or the web portal 116 can send to the advance calling service 108. At 1124, the auto advance calling service 108 causes the telephony service 102 to call out to the next number in the list; in the example shown, telephone A2 1102b is called at 1126. At 1128, the telephone can answer; in particular, an answering machine or service associated with the telephone can answer, or the called party himself may answer. The calling party user may be connected, at 1130. At 1132, the called party telephone can be disconnected; the disconnection is detected by the advance calling service 108, which provides the resume dialog to the calling party, at 1136. If the user selects NO, as shown at 1138, the call is terminated.

Figure 12:
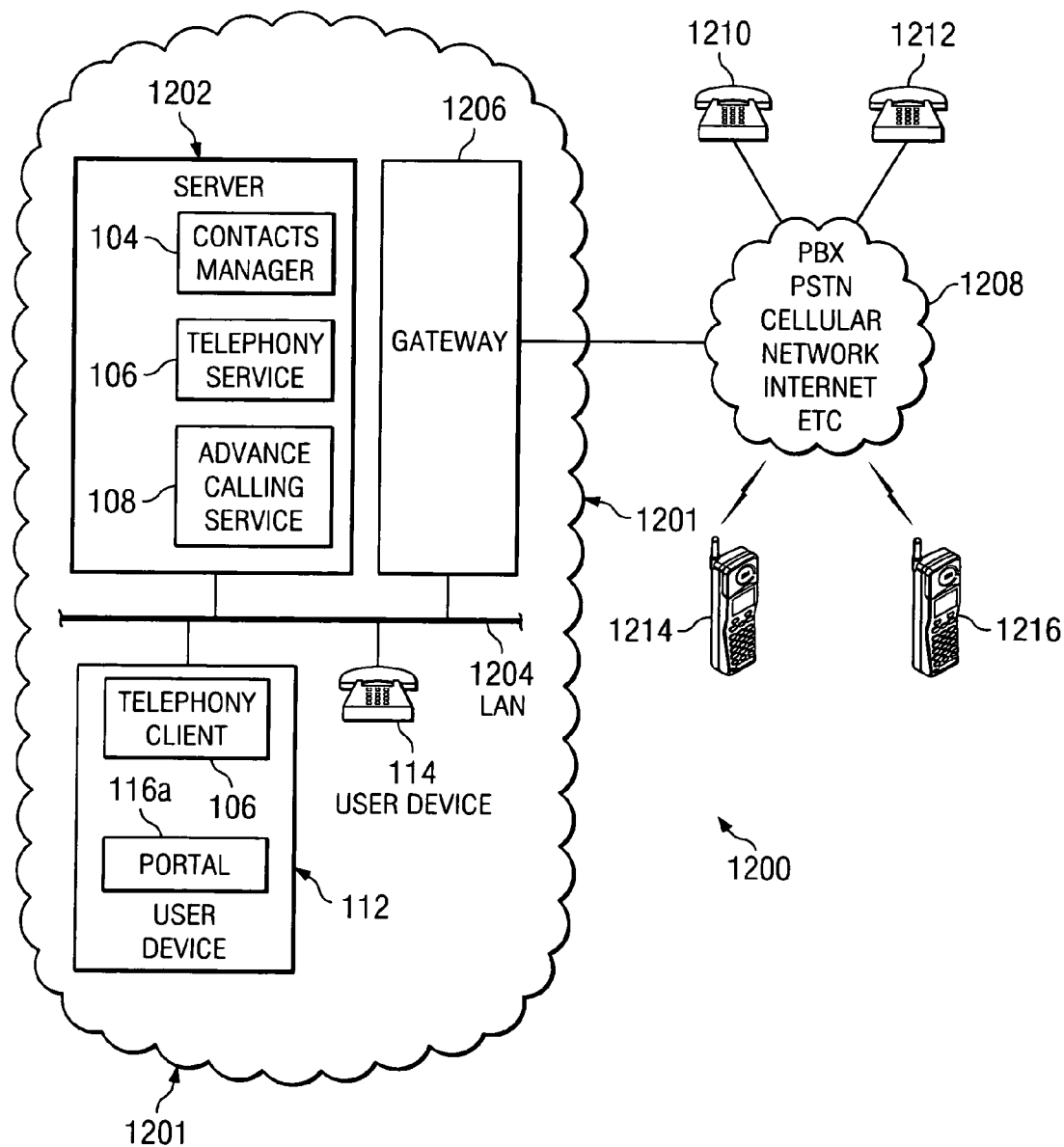
FIG. 12 is a diagram illustrating an exemplary network configuration according to embodiments of the present invention.

An exemplary network architecture that may be suitable for use with embodiments of the present invention is shown in FIG. 12. As shown, the system 1200 includes an enterprise network 1201 and a public network 1208. The enterprise network 1201 may include a wired or wireless local area network (LAN) 1204. A server 1202 may be coupled to the LAN 1204. The server may implement a telephony service 102, a contact manager 104, and an advance calling service 108. In addition, in certain embodiments, the server 1202 may implement presence features for tracking presence states of registered users and/or devices. A system in accordance with embodiments of the present invention is thus particularly useful for calling parties not registered with the server or user's system and for whom presence indicia are not available.

Also coupled, connected to or in communication with the LAN 1204 may be one or more user devices 112, 114. The user devices 112, 114 may be implemented as personal computers 112 or digital telephones 114, such as Internet Protocol (IP) based digital telephones. An exemplary personal computer 112 may also include a browser portal 116 and a telephony client 106.

A gateway 1206 may also be coupled to the LAN 1204. The gateway 1206 provides an interface to the public network 1208, which may be implemented, for example, as one or more of the PSTN, cellular telephone network, Internet, one or more PBX's, and the like. One or more telephony devices 1210, 1212, 1214, 1216, which may be implemented as one or more telephones or cellular telephones, may be in communication with the public network 1208.

Figure 13:
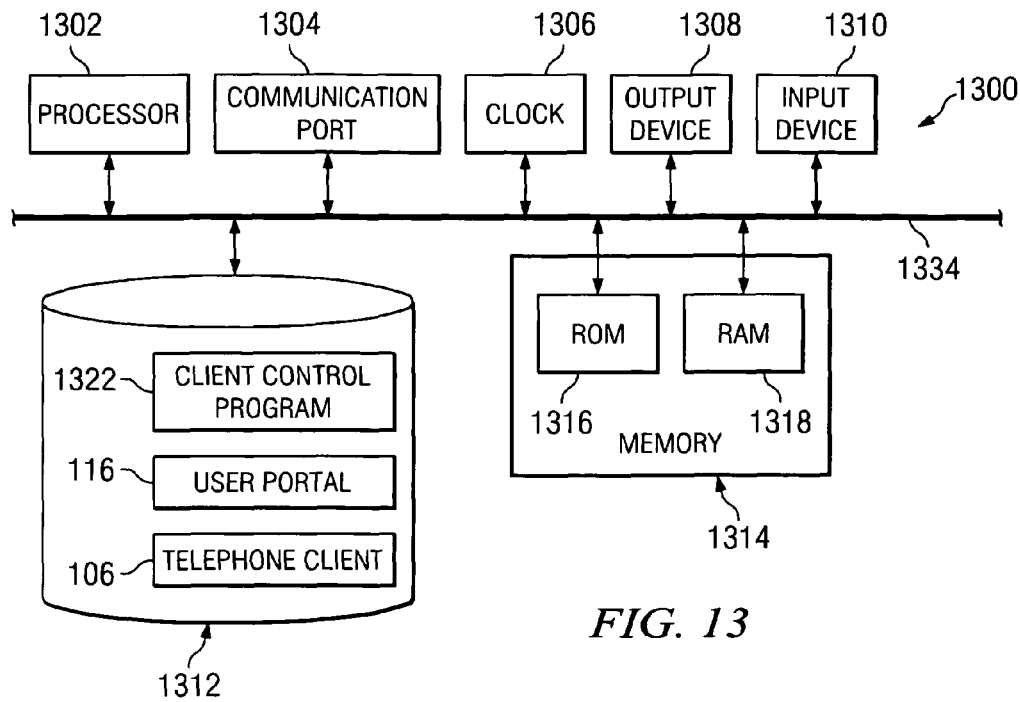
FIG. 13 is a block diagram of an exemplary user device according to an embodiment of the present invention.

Now referring to FIG. 13, a representative block diagram of a computer or processing device 1300 suitable for use as a user device according to embodiments of the present invention is shown. In particular, the computer 1300 may be a device suitable for performing or accessing auto advance calling features in accordance with embodiments of the present invention. In some embodiments, the computer 1300 may include or operate a web browser or server access portal 116 and a telephony application 106. The computer 1300 may be embodied as a single device or computer, a networked set or group of devices or computers, a workstation, mainframe or host computer, etc. In some embodiments, the computer 800 may implement one or more elements of the methods disclosed herein.

The computer 1300 may include a processor, microchip, central processing unit, or computer 1302 that is in communication with or otherwise uses or includes one or more communication ports or network interfaces 804 for communicating with user devices and/or other devices. The communication ports 1304 may include such things as telephone adapters, local area network adapters, wireless communication devices, Bluetooth technology, etc. The computer 1300 also may include an internal clock element 1306 to maintain an accurate time and date for the computer 1300, create time stamps for communications received or sent by the computer 1300, etc.

If desired, the computer 1300 may include one or more output devices 1308 such as a printer, infrared or other transmitter, antenna, display screen or monitor, text to speech converter, speaker, etc., as well as one or more input devices 1310 such as a bar code reader or other optical scanner, infrared or other receiver, antenna, magnetic stripe reader, image scanner, roller ball, touch pad, joystick, touch screen, computer keyboard, computer mouse, microphone, etc.

In addition to the above, the computer 1300 may include a memory or data storage device 1312 to store information, software, databases, documents, communications, device drivers, etc. The memory or data storage device 1312 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. Thus, the storage device 1312 may include various combinations of moveable and fixed storage. The computer 1300 also may include memory 1314, such as ROM 1316 and RAM 1318.

The processor 1302 and the data storage device 1312 in the computer 1300 each may be, for example: (i) located entirely within a single computer or other computing device; or (ii) connected to each other by a remote communication medium, such as a serial port cable, telephone line or radio frequency transceiver. In one embodiment, the computer 1300 may be implemented as one or more computers that are connected to a remote server computer, as will be explained in greater detail below.

A conventional personal computer or workstation with sufficient memory and processing capability may be used as the computer 1300. The computer 1300 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 1302. Other suitable processors may be available from Motorola, Inc., AMD, or Sun Microsystems, Inc. The processor 1302 also may be embodied as one or more microprocessors, computers, computer systems, etc.

Software may be resident and operating or operational on the computer 1300. The software may be stored on the data storage device 1312 and may include a client control program 1322, a server access client, such as a browser 116 and a telephony client or interface program 106.

The client control program 1322 may implement an operating system, such as Microsoft Windows. The server access portal 116 may implement a World Wide Web or Internet browser, such as Microsoft Explorer, Netscape Navigator, or Mozilla Firefox. The telephony client 106 may implement a telephony application or may interface to a separate telephone. It is noted that, while illustrated as software stored in storage medium 1312, the various control modules in accordance with embodiments of the present invention may also include related firmware and/or hardware components. Thus, the figure is exemplary only.

The client control program 1322, server access portal 116, and telephony client 106 may control the processor 1302. The processor 1302 may perform instructions of the control programs and clients, and thereby operate in accordance with the methods described in detail herein. The control programs and clients may be stored in a compressed, uncompiled and/or encrypted format. The control programs and clients furthermore include program elements that may be necessary, such as an operating system, a database management system and device drivers for allowing the processor 1302 to interface with peripheral devices, databases, etc. Appropriate program elements are known to those skilled in the art, and need not be described in detail herein.

According to some embodiments, the instructions of the control program and clients may be read into a main memory from another computer-readable medium, such as from the ROM 1316 to the RAM 1318. Execution of sequences of the instructions in the control program causes the processor 1302 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 1302, communication ports 1304, clock 1306, output device 1308, input device 1313, data storage device 1312, ROM 1316 and RAM 1318 may communicate or be connected directly or indirectly in a variety of ways. For example, the processor 1302, communication ports 1304, clock 1306, output device 1308, input device 1310, data storage device 1312, ROM 1316 and RAM 1318 may be connected via a bus 1334.

While specific implementations and hardware/software configurations for the computer 1300 have been illustrated, it should be noted that other implementations and hardware configurations are possible and that no specific implementation or hardware/software configuration is needed. Thus, not all of the components illustrated in FIG. 13 may be needed for the computer 1300 implementing the methods disclosed herein.

Figure 14:
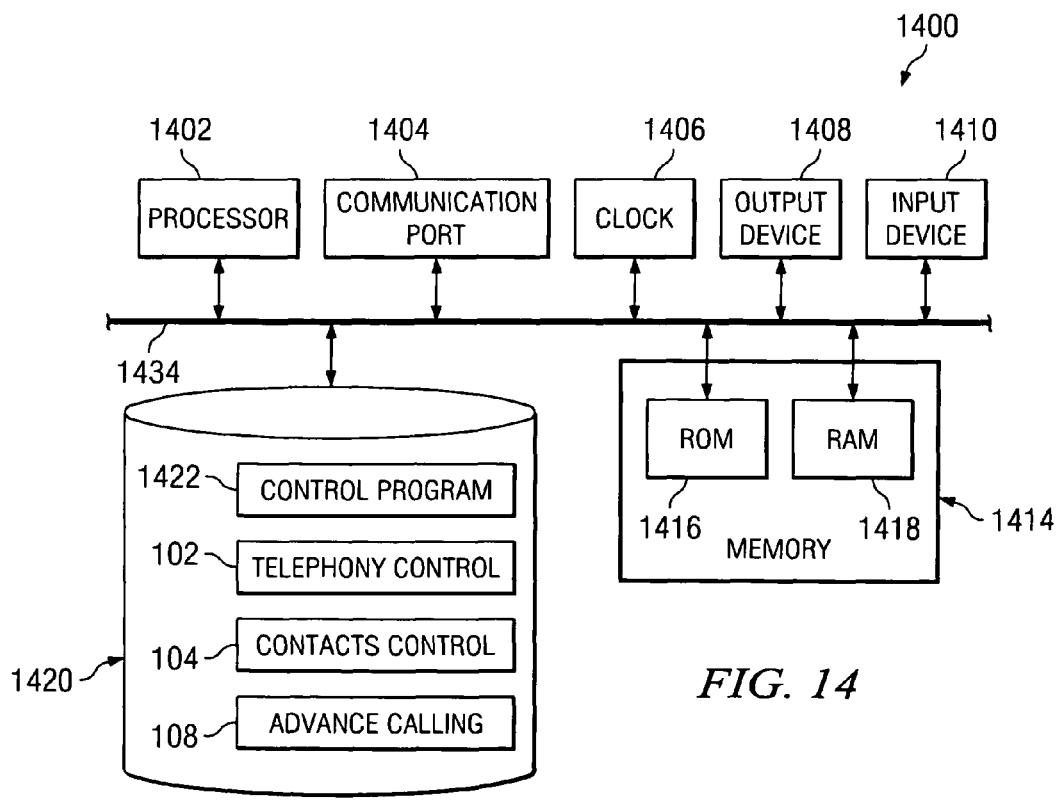
FIG. 14 is a block diagram of a server according to an embodiment of the present invention.

FIG. 14 is a diagram illustrating a server 1400 according to embodiments of the present invention. In some embodiments, the server 1400 may include or operate a telephony control 102, a contacts control or manager 104, and an advance calling control service 108. The server 1400 may be embodied as a single device or computer, a networked set or group of devices or computers, a workstation, mainframe or host computer, etc. In some embodiments, the server 1400 may implement one more elements of the methods disclosed herein.

The server 1400 may include a processor, microchip, central processing unit, or computer 1402 that is in communication with or otherwise uses or includes one or more communication ports 1404 for communicating with user devices and/or other devices. The communication ports 1404 may include such things as local area network adapters, wireless communication devices, telephone network adapters, Bluetooth technology, etc. The server 1400 also may include an internal clock element 1408 to maintain an accurate time and date for the server 1400, create time stamps for communications received or sent by the server 1400, etc.

If desired, the server 1400 may include one or more output devices 1408 such as a printer, infrared or other transmitter, antenna, audio speaker, display screen or monitor, text to speech converter, etc., as well as one or more input devices 1410 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 1400 may include a memory or data storage device 1420 to store information, software, databases, documents, communications, device drivers, etc. The memory or data storage device 1420 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 1400 also may include memory 1414, such as ROM 14141 and RAM 14141.

The processor 1402 and the data storage device 1420 in the server 1400 each may be, for example: (i) located entirely within a single computer or other computing device; or (ii) connected to each other by a remote communication medium, such as a serial port cable, telephone line or radio frequency transceiver. In one embodiment, the server 1400 may be implemented as one or more computers that are connected to a remote server computer for maintaining databases.

A conventional personal computer or workstation with sufficient memory and processing capability may be used as the server 1400. The server 1400 may be capable of high volume transaction processing, performing a significant number of mathematical calculations in processing communications and database searches. A Pentium™ microprocessor such as the Pentium II™ or IV™ microprocessor, manufactured by Intel Corporation may be used for the processor 1402. Other suitable processors may be available from Motorola, Inc., AMD, or Sun Microsystems, Inc. The processor 1402 also may be embodied as one or more microprocessors, computers, computer systems, etc.

Software may be resident and operating or operational on the server 1400. The software may be stored on the data storage device 1420 and may include a control program 1422 for operating the server, databases, etc. The control program 1422 may include or interface to the telephony control 102, contacts control 104, and advance calling control 108.

The client control program 1412 may implement an operating system, such as Microsoft Windows. The control program and control units may control the processor 1402. The processor 1402 may perform instructions of the control programs, and thereby operate in accordance with the methods described in detail herein. The control program and control units may be stored in a compressed, uncompiled and/or encrypted format. The control program and control units furthermore includes program elements that may be necessary, such as an operating system, a database management system and device drivers for allowing the processor 1402 to interface with peripheral devices, databases, etc. Appropriate program elements are known to those skilled in the art, and need not be described in detail herein. It is noted that, while illustrated as software stored in storage medium 1412, the various control modules in accordance with embodiments of the present invention may also include related firmware and/or hardware components. Thus, the figure is exemplary only.

The server 1400 also may include or store information regarding identities, user devices, communications, etc., in database(s). Information regarding other application program data may be stored in application database (not shown). In some embodiments, some or all of one or more of the databases may be stored or mirrored remotely from the server 1400.

According to some embodiments, the instructions of the control program may be read into a main memory from another computer-readable medium, such as from the ROM 1416 to the RAM 1416. Execution of sequences of the instructions in the control program causes the processor 1402 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 1402, communication ports 1404, clock 1408, output device 1408, input device 1410, data storage device 1412, ROM 1416, and RAM 1418 may communicate or be connected directly or indirectly in a variety of ways. For example, the processor 1402, communication ports 1402, clock 1408, output device 1408, input device 1410, data storage device 1412, ROM 1416, and RAM 1418 may be connected via a bus 1434.

While specific implementations and hardware/software configurations for the server 1400 have been illustrated, it should be noted that other implementations and hardware configurations are possible and that no specific implementation or hardware/software configuration is needed. Thus, not all of the components illustrated in FIG. 14 may be needed for the server 1400 implementing the methods disclosed herein.

The methods described herein may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, in some embodiments, many, if not all, of the elements for the methods described above are optional or can be combined or performed in one or more alternative orders or sequences and the claims should not be construed as being limited to any particular order or sequence, unless specifically indicated.

Each of the methods described above can be performed on a single computer, computer system, microprocessor, etc. In addition, in some embodiments, two or more of the elements in each of the methods described above could be performed on two or more different computers, computer systems, microprocessors, etc., some or all of which may be locally or remotely configured. The methods can be implemented in any sort or implementation of computer software, program, sets of instructions, programming means, code, ASIC, or specially designed chips, logic gates, or other hardware structured to directly effect or implement such software, programs, sets of instructions, programming means or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. The drawings are not necessarily to scale and illustrate the device in schematic block format. It is intended that the scope of the invention be defined by the claims appended hereto, and their equivalents

What is claimed is:

1. A telecommunications device, comprising:
   a telephony controller;
   a contacts controller, said contacts controller configured to maintain a plurality of contact telephone numbers for individual contacts, and
   an automatic advance calling controller operably coupled to said contacts controller and said telephony controller, when a call is initiated by a caller, the automatic advance calling controller is configured to cause the telephony controller to automatically and sequentially call the plurality of contact telephone numbers from a list for the particular contact in a predetermined order until the call is successfully completed to one of the plurality of contact telephone numbers from the list or the list is exhausted,
   wherein the automatic advance calling controller is configured to provide an option to continue calling a next number in the list or to terminate the call when the call is connected to an answering service or has failed to be successfully completed after a "no answer" period predetermined by the calling user.

2. A telecommunications device in accordance with claim 1, wherein the answering service is provided by an answering device at a telephone.

3. A telecommunications device in accordance with claim 2, wherein said automatic advance calling controller is configured to advance to a next one of the plurality of telephone numbers when a call to a current one has failed to be successfully completed after a predetermined "no answer" period.

4. A telecommunications device in accordance with claim 3, wherein the predetermined "no answer" period is user selectable.

5. A telecommunications device in accordance with claim 4, wherein the predetermined "no answer" period is variable for each telephone number.

6. A telecommunications device in accordance with claim 2, wherein the predetermined order is selectable using a web portal.

7. A telecommunications device in accordance with claim 4, wherein the predetermined "no answer" period is user selectable using a web portal.

8. A telecommunications device in accordance with claim 1, wherein the automatic advance calling controller is responsive to a web portal.

9. A telecommunications method, comprising:
   specifying a plurality of telephone numbers for a contact;
   specifying an order of calling the contact at the plurality of telephone numbers in a list;
   selecting the contact for calling;
   automatically and sequentially calling by an automatic advance calling controller the numbers in the list in the order specified until the call is answered or the list is exhausted; and wherein the automatic advance calling controller is configured to provide an option to continue calling a next number in the list or to terminate the call when the call is connected to an answering service or has failed to be successfully completed after a "no answer" period predetermined by the calling user.

10. A method in accordance with claim 9, wherein said specifying an order comprises specifying via a web browser portal.

11. A method in accordance with claim 9, further comprising specifying a ring no answer period, expiration of which defines a failure by the contact to answer at a particular number.

12. A method in accordance with claim 11, further comprising specifying a ring no answer period for each of the telephone numbers in the ordered list.

13. A method in accordance with claim 9, wherein said sequentially calling comprises selecting a contact for calling using a web browser interface.

* * * * *